United States Patent
Park et al.

(10) Patent No.: US 11,775,565 B2
(45) Date of Patent: Oct. 3, 2023

(54) SYSTEMS AND METHODS FOR DATABASE RECONCILIATION

(71) Applicant: COUPANG CORP., Seoul (KR)

(72) Inventors: SungMin Park, Seoul (KR); Daeil Kim, Seoul (KR); Sungyeol Bae, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/070,600

(22) Filed: Oct. 14, 2020

(65) Prior Publication Data

US 2022/0114197 A1 Apr. 14, 2022

(51) Int. Cl.
*G06F 16/28* (2019.01)
*G06Q 30/0201* (2023.01)
(Continued)

(52) U.S. Cl.
CPC .......... *G06F 16/285* (2019.01); *G06F 16/904* (2019.01); *G06Q 30/0201* (2013.01);
(Continued)

(58) Field of Classification Search
CPC ..... G06F 16/285; G06F 16/904; G06N 20/00; G06Q 10/087; G06Q 30/0201;
(Continued)

(56) References Cited

U.S. PATENT DOCUMENTS 10,042,895 B1 8/2018 Geva et al.
10,423,761 B2 9/2019 Docken et al.
(Continued)

FOREIGN PATENT DOCUMENTS

CN 109360039 A 2/2019
CN 109766339 A 5/2019
(Continued)

OTHER PUBLICATIONS

Einav et al., Assessing Sale Strategies in Online Markets Using Matched Listings, American Economic Journal. Microeconomics, vol. 7, Issue 2, pp. 215-247, May 2015 (Year: 2015).*
(Continued)

*Primary Examiner* — Allison G Wood
*Assistant Examiner* — Anna Mae Mitros
(74) *Attorney, Agent, or Firm* — FINNEGAN, HENDERSON, FARABOW, GARRETT & DUNNER LLP

(57) ABSTRACT

A method for database reconciliation, comprising: receiving, from one or more sources, attribute data of a plurality of attribute data types representing aspects of a product; generating a plurality of attribute categories based on the received attribute data types, each attribute category corresponding to one of the received attribute data types and containing all attribute data of the one of the received attribute data type; determining data scores for each of the attribute data contained in each of the plurality of attribute categories; generating reconciled data for each of the attribute categories, the reconciled data being the attribute data in each of the attribute categories having the highest data score; storing in a database, the plurality of attribute categories each containing reconciled data corresponding to the product; and providing, from the database, the reconciled data for display on a display interface.

17 Claims, 10 Drawing Sheets

(51) Int. Cl.
  *G06Q 30/0601* (2023.01)
  *G06T 7/00* (2017.01)
  *G06F 16/904* (2019.01)
  *G06Q 10/0833* (2023.01)
  *G06Q 10/083* (2023.01)
  *G06Q 10/0835* (2023.01)
  *G06K 7/10* (2006.01)

(52) U.S. Cl.
  CPC ....... *G06Q 30/0643* (2013.01); *G06T 7/0002* (2013.01); *G06K 7/10297* (2013.01); *G06Q 10/0833* (2013.01); *G06Q 10/0835* (2013.01); *G06Q 10/0838* (2013.01); *G06Q 30/0627* (2013.01); *G06Q 30/0629* (2013.01); *G06Q 30/0633* (2013.01); *G06T 2207/20081* (2013.01); *G06T 2207/30168* (2013.01)

(58) Field of Classification Search
  CPC .. G06Q 30/0643; G06Q 30/0601–0645; G06T 7/0002
  USPC ................................................ 705/26.1–27.2
  See application file for complete search history.

(56) References Cited

U.S. PATENT DOCUMENTS

| | | | | |
|---|---|---|---|---|
| 10,430,423 | B1* | 10/2019 | Poddar | G06F 16/90344 |
| 2014/0304104 | A1* | 10/2014 | Ladue | G06Q 30/0631 |
| | | | | 705/26.7 |
| 2015/0142609 | A1 | 5/2015 | Garera et al. | |
| 2016/0042427 | A1 | 2/2016 | Thakur et al. | |
| 2016/0086240 | A1* | 3/2016 | Musgrove | G06F 16/285 |
| | | | | 705/26.2 |
| 2016/0283998 | A1 | 9/2016 | Pathak | |
| 2018/0174220 | A1* | 6/2018 | Jadhav | G06Q 30/0631 |
| 2020/0151663 | A1* | 5/2020 | Balakrishnan | G06N 20/00 |
| 2021/0035197 | A1* | 2/2021 | Indrakanti | G06Q 30/0643 |
| 2021/0295422 | A1* | 9/2021 | Periyathambi | H04L 67/535 |

FOREIGN PATENT DOCUMENTS

| | | |
|---|---|---|
| CN | 109947830 A | 6/2019 |
| CN | 110135769 A | 8/2019 |
| KR | 10-2008-0008676 A | 1/2008 |
| KR | 10-1353996 B1 | 1/2014 |
| KR | 10-2015-0101536 A | 9/2015 |
| KR | 10-2017-0136846 A | 12/2017 |
| KR | 10-2019-0079829 A | 7/2019 |
| KR | 10-2265946 B1 | 6/2021 |
| TW | 201624386 A | 7/2016 |
| WO | WO 2010/117581 A1 | 10/2010 |

OTHER PUBLICATIONS

International Search Report and Written Opinion for counterpart application No. PCT/IB2020/059790 dated Jul. 12, 2021 (8 pages).
Notice of Allowance issued by the Korean Patent Office in counterpart Application No. 10-2021-7019377, dated Nov. 26, 2021.
Taiwanese Office Action in counterpart Taiwanese Application No. 110115396 dated Jan. 28, 2022 (24 pages).
Taiwanese Office Action and Search Report in counterpart Taiwanese Patent Application No. 110115396 dated Sep. 28, 2022 (25 pages).
Examination Notice dated Jun. 6, 2022, in counterpart Hong Kong Application No. 22021031638.0, (3 pages).
Taiwanese Rejection Decision in counterpart Taiwanese Patent Application No. 110115396 dated Jan. 31, 2023 (9 pages).

* cited by examiner

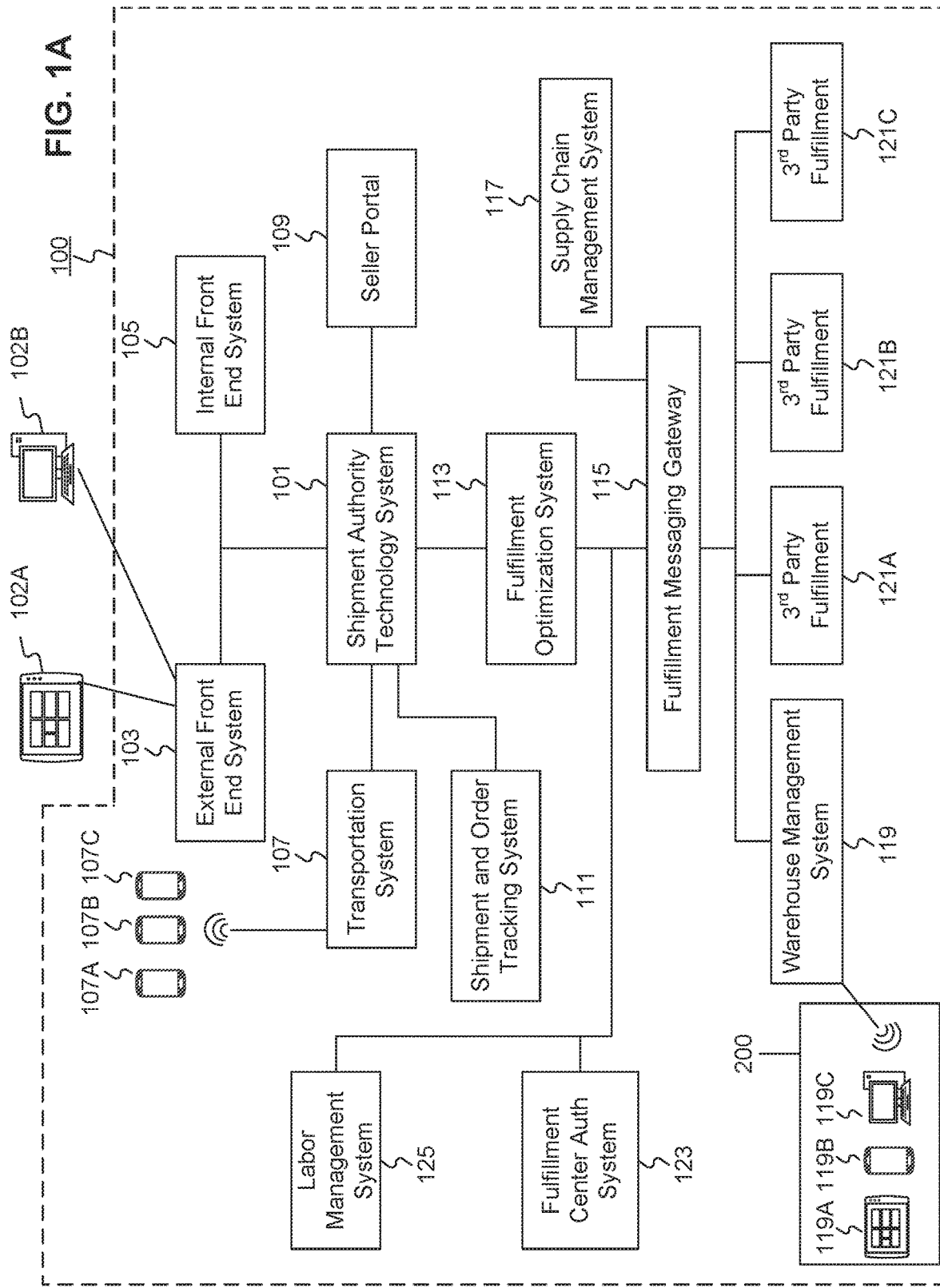

Favorites Application    login  Sign Up  Service center all

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

Product Details    Reviews (285)    Contact Us    Shipping & Returns

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

SYSTEMS AND METHODS FOR DATABASE RECONCILIATION

TECHNICAL FIELD

The present disclosure generally relates to computerized systems and methods for reconciling databases. In particular, embodiments of the present disclosure relate to inventive and unconventional systems relate to reconciling overlapping, duplicate, or conflicting data entries stored in databases.

BACKGROUND

In the field of on-line retail business, information relating to a variety of products are stored in databases. When a shopper browses display interfaces of the on-line retail business (such as web pages), server systems retrieve this information from the databases for display to the shopper. In an open on-line retail system where multiple vendors operate on the same platform, each individual vendor may decide what products it will sell using that platform. This can lead to the same product being offered by multiple different vendors. If each individual vendor maintains control over the products it sells, including providing product descriptions, there may be situations where a single product may have overlapping, duplicate, or conflicting data provided by different vendors.

Thus, problems arise when the server systems receive requests from shoppers to view product data if there are multiple vendors each supplying data that may differ from data supplied by other vendors for the same product. If each vendor's product is displayed separately, it may be exceedingly laborious for the shopper to view all of the displayed data for multiple versions of the same product. If only a single product page is displayed for a product, data supplied by different vendors must somehow be reconciled.

How the data are reconciled may affect the efficiency and quality of the on-line retail system. The data that are displayed should be accurate, informative, and enticing to potential shoppers. But existing methods and systems of reconciling these data are insufficient in selecting the most relevant and highest quality data, resulting the display generated to the shopper being less than optimal. Therefore, there is a need for improved methods and systems with to reconcile data to achieve the most optimized product display.

SUMMARY

One aspect of the present disclosure is directed to a method for database reconciliation, comprising: receiving, from one or more sources, attribute data of a plurality of attribute data types representing aspects of a product; generating a plurality of attribute categories based on the received attribute data types, each attribute category corresponding to one of the received attribute data types and containing all attribute data of the one of the received attribute data type; determining data scores for each of the attribute data contained in each of the plurality of attribute categories; generating reconciled data for each of the attribute categories, the reconciled data being the attribute data in each of the attribute categories having the highest data score; storing in a database, the plurality of attribute categories each containing reconciled data corresponding to the product; and providing, from the database, the reconciled data for display on a display interface.

Another aspect of the present disclosure is directed to a computerized system for database reconciliation, comprising: one or more processors; storage media containing instructions to cause the one or more processors to execute the steps of: receiving, from one or more sources, attribute data of a plurality of attribute data types representing aspects of a product; generating a plurality of attribute categories based on the received attribute data types, each attribute category corresponding to one of the received attribute data types and containing all attribute data of the one of the received attribute data type; determining data scores for each of the attribute data contained in each of the plurality of attribute categories; generating reconciled data for each of the attribute categories, the reconciled data being the attribute data in each of the attribute categories having the highest data score; storing in a database, the plurality of attribute categories each containing reconciled data corresponding to the product; and providing, from the database, the reconciled data for display on a display interface.

Yet another aspect of the present disclosure is directed to a system for generating database reconciliation, comprising: receiving a request to reconcile entries relating to a product in a database; receiving attribute data of a plurality of attribute data types representing an aspect the product from one or more sources; generating a plurality of attribute categories based on the received attribute data types, each attribute category corresponding to one of the received attribute data type and containing all attribute data of the one of the received attribute data type; determining data scores for each of the attribute data contained in each of the plurality of attribute categories; generating reconciled data for each of the attribute categories, the reconciled data being the attribute data in each of the attribute categories having the highest data score; storing in the database, the plurality of attribute categories each containing reconciled data, corresponding to the product; and providing to a display interface from the database, the reconciled data for display.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Detail Page (SDP) that includes a product and information about the product along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

According various embodiments of the present disclosure, there are provided unconventional computer implemented systems for reconciling databases. Prior systems may leave it to human intervention to reconcile overlapping, duplicate, or conflicting data provided by multiple vendors for the same product. This may be extremely resource extensive and inefficient. Moreover, if data from different vendors are reconciled randomly, or reconciled using simple or unoptimized rules, the quality and usefulness of the reconciled data may be compromised, greatly reducing the usefulness of user interfaces generated based on these reconciled data.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
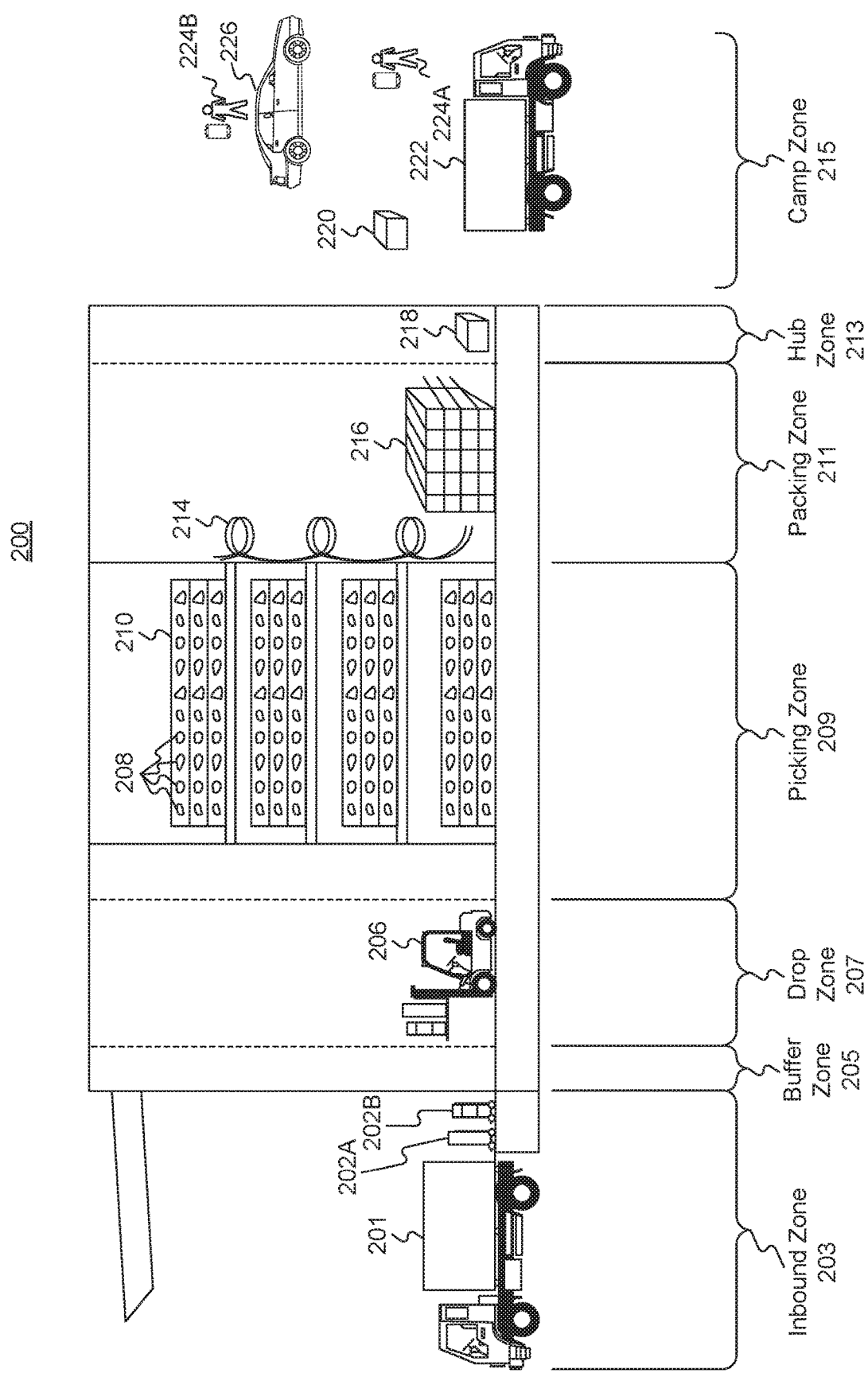
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

A product that is available for purchase via system 100 may be associated with a plurality of attribute data. Attribute data may refer to information about various aspects of the product, in data form, that may be stored in on or more databases connected to system 100. Examples of attribute data may include name, price, quantity, shelf-life, color, size, manufacture, brand, and/or any other data that serve to inform a shopper some aspects of the product. In some embodiments, attribute data may also include images of the product. When the product is displayed to a shopper, these attribute data may be presented to shoppers to inform the shopper about the product.

By way of example, referring back to FIG. 1C, an exemplary product is displayed on an SDP. On the SDP depicted, examples of attribute data of the product on display include the name of the product ("mozzarella cheese"), the price ("20,000 won"), the weight ("1 kg×2 pieces"), country of origin, shelf life ("2019-11-04"), quantity ("2"), cheese form ("crushed (powder)"), and item number ("23532-3432551"). The SDP further includes images of the product, which may also be examples of attribute data. A person of ordinary skill in the art will appreciate that different products or categories of product may be associated with different attribute data.

In the case when multiple vendors supply the same product for sales, each vendor may provide attribute data that are overlapping and duplicate with attribute data provided by other vendors. For example, two different vendors may both provide information indicating that the product are sold in quantity of "2". In some embodiments, vendors may provide attribute data that are not overlapping. For example, one vendor may provide information indication that the cheese form is "crushed (powder)," while another vendor may provide no such information. In some embodiments, vendors may provide attribute data that are overlapping but are in conflict. For example, vendors may provide different images for the same product. Thus, before a display such as SDP of FIG. 1C is presented to the shopper, the attribute data should be reconciled such that the shopper only sees one set of attribute data for the same product among the different vendors.

Figure 3:
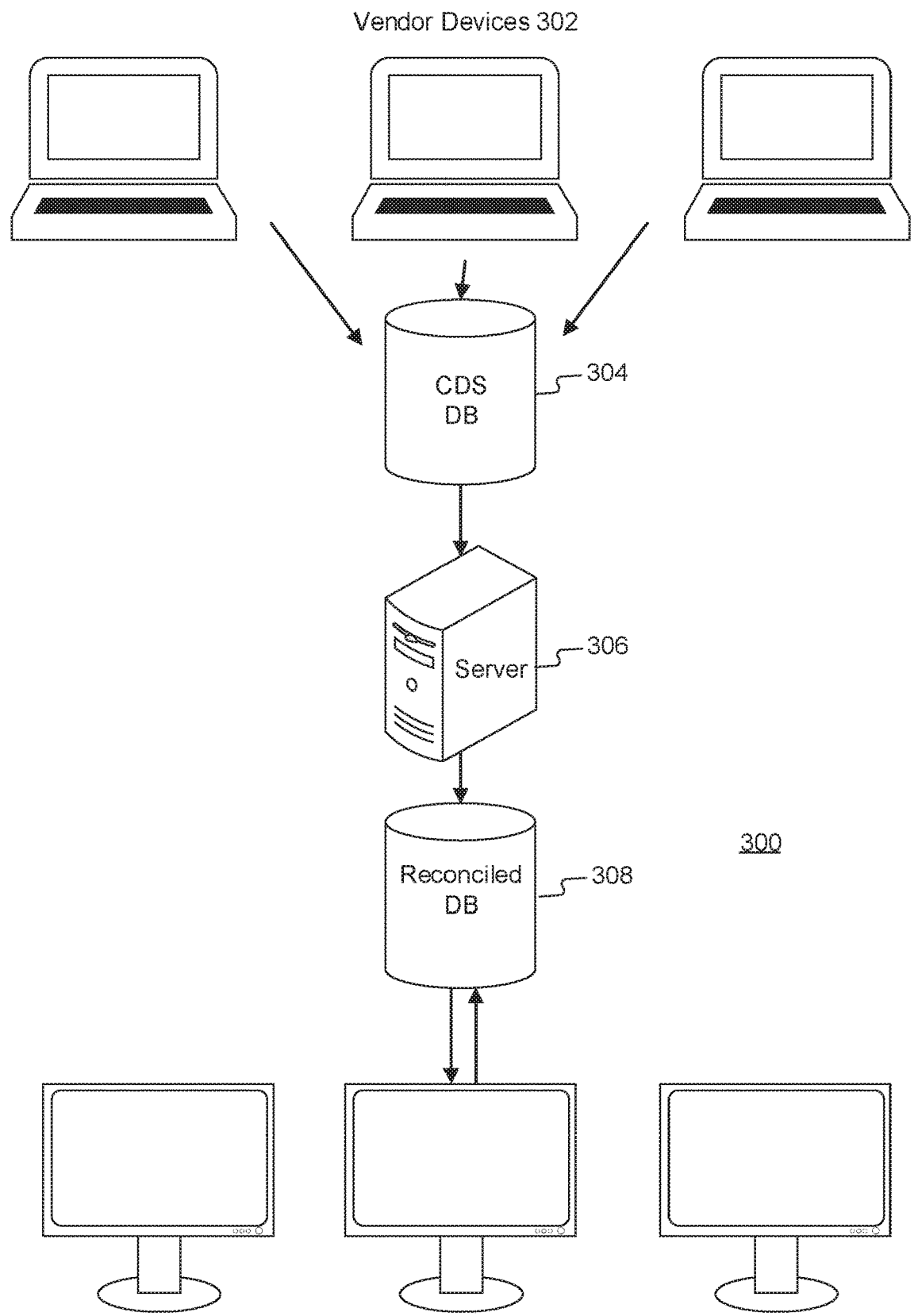
FIG. 3 is a diagrammatic illustration of an exemplary system for reconciling database, consistent with the disclosed embodiments.

By way of example FIG. 3 is a diagrammatic illustration of an exemplary system for reconciling a database, consistent with the disclosed embodiments. System 300 may include vendor devices 302, a common data storage database (CDS DB) 304, a server 306, a reconciled database (reconciled DB) 308, and user devices 310.

Vendor devices 302 may refer to computer devices associated with vendors. Vendors may be individuals or organizations having ties to the on-line business retailer associated with system 100, and may provide products for sale through system 100. In some embodiments, vendor devices 302 may be user devices 102A-C depicted in FIG. 1A. Vendors may use vendor devices 302 to provide information about the products for sale, and this information may be provided in forms of data. The data may be stored in in one or more databases connected to system 100, such as CDS DB 304. In some embodiments, vendor devices 302 may interact with CDS DB 304 via external front end system 103.

Server 306 may be a computing device including one or more processors, I/O sections, and memory storage media. Server 306 may retrieve, as inputs, data from entries in one database, such as CDS 304, and may provide as output, processed data for storage in another database, such as reconciled DB 308. Reconciled DB 308 may be another example of a database connected to system 100. In some embodiments, server 306 reconciles input data stored in CDS 304, and provide the reconciled data for storage in reconciled DB 308.

User devices 310 may refer to computer devices associated with shoppers. Shoppers may be individuals or organizations having access to the on-line retail business associated with system 100, and may purchase products through system 100. In some embodiments, user devices 310 may be user devices 102A-C depicted in FIG. 1A. Shoppers may use devices 310 to view information related the products for sale, and these information may be viewed in a display page generated using data supplied form system 100, such as SDP depicted in FIG. 1C. The data may be supplied from one or more databases connected to system 100, such as reconciled DB 308. In some embodiments, user devices 310 may interact with reconciled DB 308 via external front end system 103.

According to some embodiments, there are provided methods for database reconciliation. Reconciliation as used herein may refer to processes, steps, and/or algorithms for grouping, merging, selecting, or otherwise processing of different, overlapping, duplicate, and/or conflicting data for entries in a database. Examples of reconciled data may be seen in the display depicted in SDP of FIG. 1C. According to some embodiments, there are provided systems for database reconciliation. Examples of the systems for database reconciliation may include server 306 depicted in FIG. 3.

Figure 4:
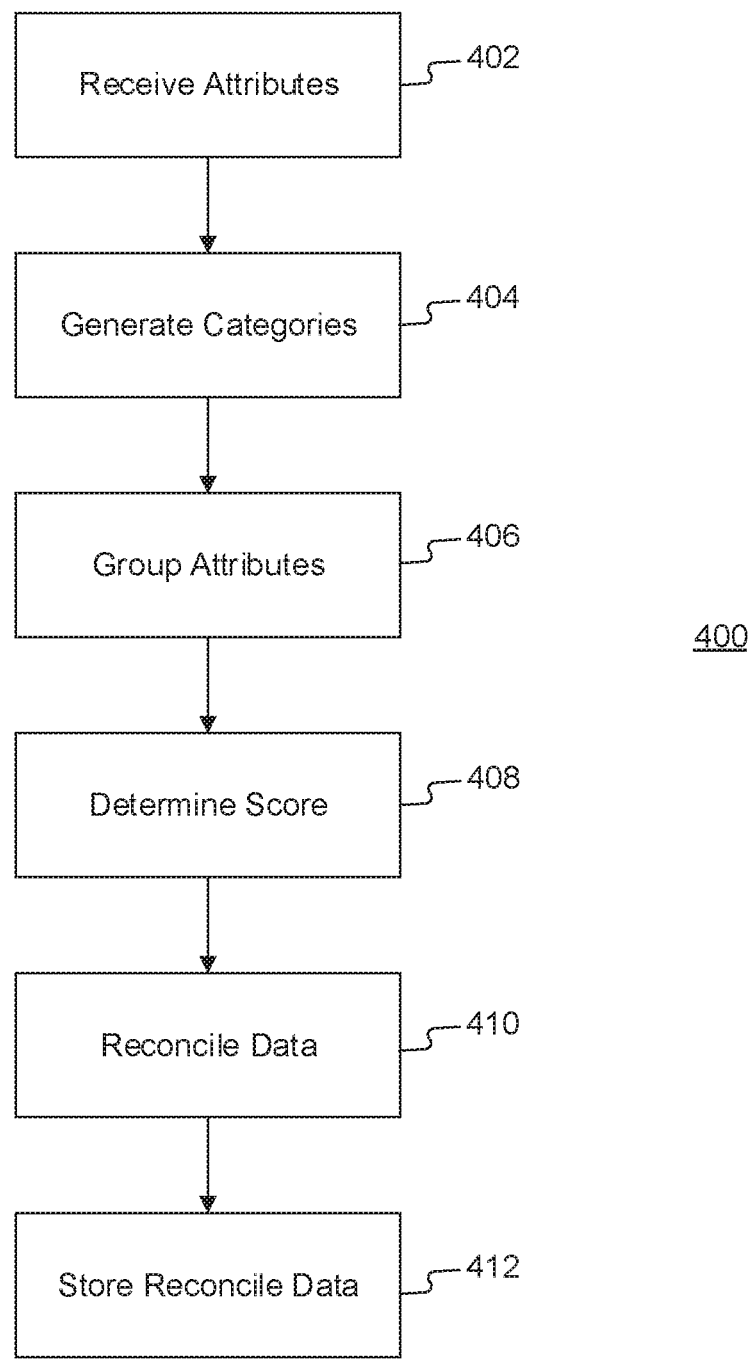
FIG. 4 depicts a flow chart of an exemplary process for reconciling database, consistent with the disclosed embodiments.

FIG. 4 depicts a flow chart of an exemplary process for database reconciliation, consistent with the disclosed embodiments. Process 400 may be carried out/executed by server 306.

In step 402, server 306 receives attribute data from CDS 304. In some alternative embodiments, server 306 may directly receive attribute data from vendor devices 302.

In some embodiments, database reconciliation may include receiving, from one or more sources, attribute data of a plurality of attribute data types representing aspects of a product. A source of attribute data may refer to a vendor or a vendor device. For example, a first vendor may one source of attribute data for a product, and a second vendor may be a difference source of attribute data for the same product. Attribute data types may refer to a differentiation or grouping of attribute data based on its nature or use, prior at reconciliation. Attribute data types may be product name, image, and/or product specification, though one of ordinary skill will understand that other types are possible as well.

In some embodiments, attribute data may be tagged to indicated whether the attribute data is a product name, an image, or a product specification. Product specification may refer to attribute data that are neither the product name or images, and may include a plurality of fields each describing an aspect of the product Tagging may be performed by the vendors during a process or registering data. For example, external front end system 103 may generate an interface for display on vendor devices 302 for the vendors to input attribute data associated with a product. While using this interface, vendors may tag each attribute data provided to indicate that it is a product name, an image, or one or more fields of product specification.

In step 404, server 306 generates categories of attribute data.

In some embodiments, database reconciliation may include generating a plurality of attribute categories based on the received attribute data types, each attribute category corresponding to one of the received attribute data types and containing all attribute data of the one of the received attribute data type. Attribute categories may refer to aspects of a product that is described by attribute data for that type. For example, an attribute category of a product may be a field for "color" of the product, and the corresponding attribute data for the field of "color" may be texts "red", "white," or "blue." In some embodiments, fields in the attribute category of a product may correspond to fields in the product specification. In a different example, another attribute category may be product image, and different pictures or photos associated with the product may be attribute data corresponding to that attribute category. In yet a different example, the attribute category may be a name of the product. In some embodiments, attribute categories may be groupings of attribute data for the purpose of reconciliation.

In step 406, server 306 groups attribute data based within attribute categories.

In some embodiments, the attribute data of the product names are character strings of names. For example, in the instance where attribute data type or the attribute data category is the product name, the attribute data may be a string of characters and numbers, and server 306 may group all attribute data that are product names within the attribute category of product name. For instance, when a vendor registers a scarf for sale on system 100, it may provide attribute data "Scarf" and indicate to system 100 that "Scarf" is the product's name.

In some embodiments, the plurality of attribute data types includes one or more fields relating to product specifications, the attribute data of the one or more fields are character strings corresponding to the one or more fields. In some embodiments, the one or more fields includes size, color, model, production year, and/or serial number. Each of the one or more fields may correspond to at least one attribute category generated in step 404. Attribute data from different sources may have different fields. For example, a first vendor may supply data regarding size, model, and production for a product, while a second vendor may supply data regarding color only. Server 306 may group all attribute data based on the one or more fields, such at attribute data describing color of the product are grouped under "color" field, attribute data describing size of the product are grouped under "size" field, and so on. All of the one or more fields may fall under the same attribute categories of product specification. For instance, when a vendor registers a scarf for sale on system 100, it may provide attribute data "red" and indicate to system 100 that "red" is a product specification that belongs to a field of "color," so server 306 groups "red" with other attribute data for the same product that belongs to the field of "color."

In some embodiments, the plurality of attribute data types includes product image, and the attribute data of product image are images. Server 306 may group all images of the same product under the attribute category of product image.

In step 408, server 306 determines data scores of the attribute data.

In some embodiments, database reconciliation includes determining data scores for each of the attribute data contained in each of the plurality of attribute categories. In some embodiments, each of the one or more sources has a source score, and attribute data are associated with the corresponding source score. A source score may be a numerical value associated with a source. For example, each vendor may have a source score assigned by the on-line retail business, the score may be stored in databases connected to system 100 that store other information associated with the vendors. In some embodiments, the source score of each of the one or more sources is based on a source status assigned to each of the one or more sources and a length of active time period of each of the one or more sources. Source status may refer to a status of the vendor, which may be based on the type of vendor. The source score of each of the status may be predetermined. For example, the on-line retail business may predefine a numerical value of each of the status. In some embodiments, the source status includes one of a system retail status, brand vendor status, or third party status. For example, the on-line retail business (e.g. owner of system 100) may directly sell products to shoppers, and it has a source status of system retail status. In some instances, vendors may be the brand owners of the products sold on through system 100, and these vendors may have brand vendor status. In some instances, vendors may be third-parties, resellers, or otherwise do not qualify for either system retail status or brand vendor status, and these vendors may have third party status.

In some embodiments, the system retail status has a source score higher than that of the brand vendor status, and the brand vendor status has a source score higher than that of a third party status. As the owner and maintainer of system 100, the on-line retail business may be in a position to manage databases of system 100, and may have the best opportunity to provide the higher quality or the most up-to-date data of the product. Thus, the system retail status may be assigned a source score higher than that of brand vendors status or third party status. Brand vendors may be parties that are typically familiar with the products themselves and may have more resources than typical third party vendors, so the brand vendor status has a source score higher than that of a third party status. Examples of brand vendors may include manufacturers of the product, or owner of the brand of the product.

In some embodiments, when two or more sources have the same source status, the source having a longer length of active time period has a higher source score than sources having a shorter length of active time period. Between different third party vendors, the vendor with longer history of using system 100 may be most familiar with system 100, or may be the most loyal user of system 100, and thus may be assigned a source score higher than a vendor that is newer to system 100. In some embodiments, a length of active time period of the source is determined based on the earliest registration time of the source. For example, a third party vendor that registers with system 100 may be time stamped by system 100. Between different third party vendors, the one with the earliest time stamp may be considered to have the longest active time period.

In some embodiments, determining data score for the character strings of names includes determining source scores corresponding to the character strings of names. For example, in the instance where the attribute data category is the product name, the attribute data are usually a string of characters and numbers, and server 306 may determine data scores of the different attribute data based on the source scores of the respective attribute data.

In some embodiments, determining data score for the character strings corresponding to the one or more fields includes identifying the number of one or more fields associated with each of the one or more sources. For example, for fields associated with product specification, server 306 may determine, for each attribute data of each field, the source (e.g. vendor) of the attribute data. The attribute data are typically strings of characters or numbers. In some embodiments, determining score for the character string includes determining source scores corresponding to the character strings corresponding to the one or more fields. For example, for each attribute data, server 306 may generate data score using the respective source score.

In some embodiments, server 306 may also generate the data score for character strings corresponding to each of the one or more fields based on the number of one or more fields associated with each of the one or more sources and the source scores. For example, server 306 may compare the number of fields correspond to the product specifications from each of the source, and generated different data scores based on how many fields are contained in product specifications from each of the source. In some instances, vendors that supply more information about a product will result more detailed product specification, hence resulting in more fields. Server 306 may weigh data score in favor of such vendors as more detailed product specification may indicate higher quality data.

In some embodiments determining data score for the images comprising analyzing each of the images using one or more machine learning models for at least one of image size, image pixel, resolution, or image match; generating the data score for each image based on the analysis. Machine learning models may refer to computer software, programs and/or algorithms that are capable of carrying out tasks without specifically being instructed or programmed to do so. Examples of machine learning models include neural networks, decision trees, regression analysis, Bayesian networks, genetic algorithms, and/or other models configured to train on some training data, and is configured by the training to process additional data to make predictions or decisions. For example, using machine learning models, server 306 may rank the images, based on one of image size, image pixel, and/or resolution, and scores may be assigned based on the ranking. For example, images with higher pixel, resolution and/or size may be of higher quality, and thus should be assigned higher data score as compared to images with lower pixel, resolution or size.

Figure 5A:
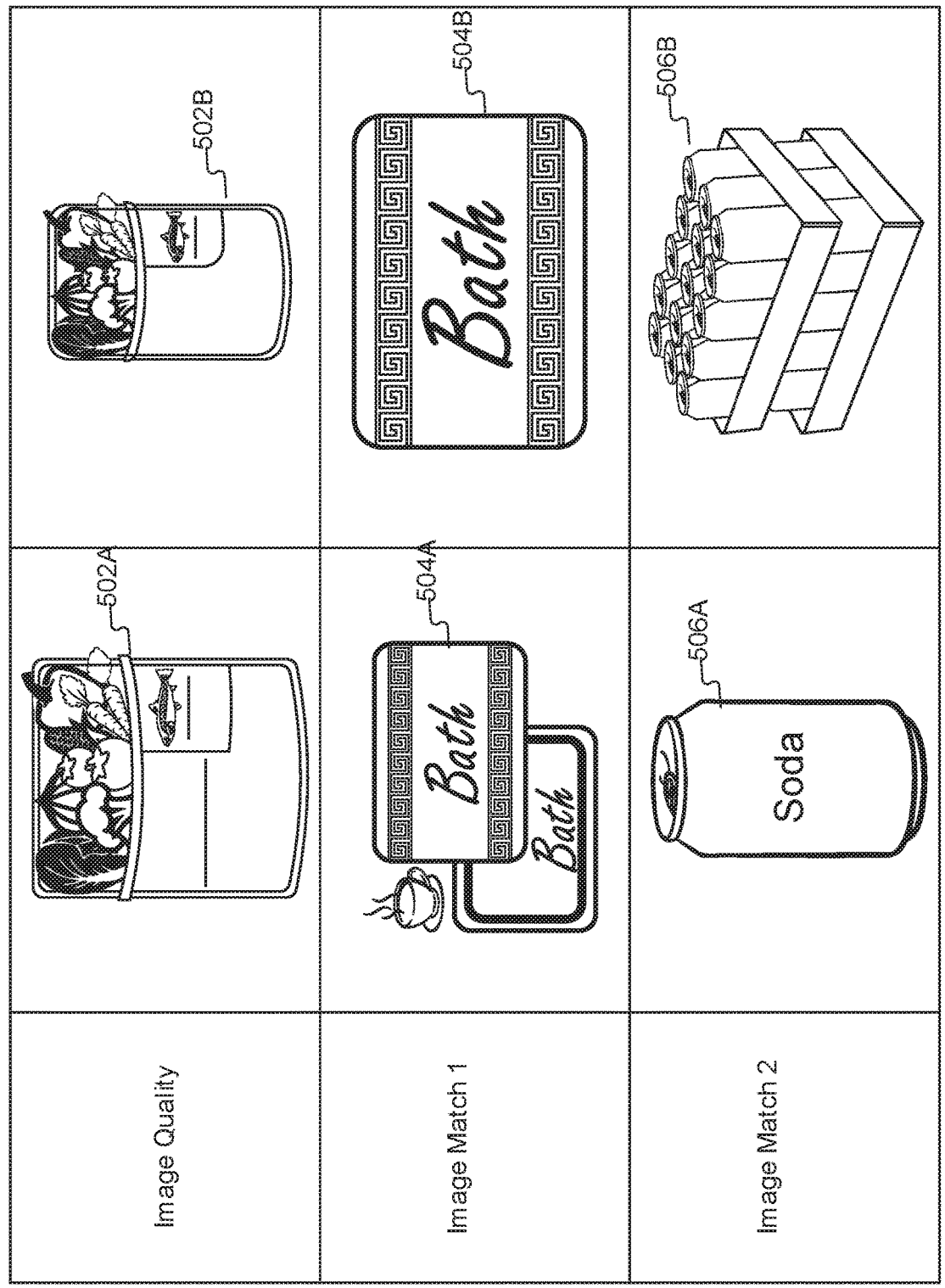
FIGS. 5A and 5B depicts examples of different images of products for reconciliation, consistent with the disclosed embodiments.
Figure 5B:
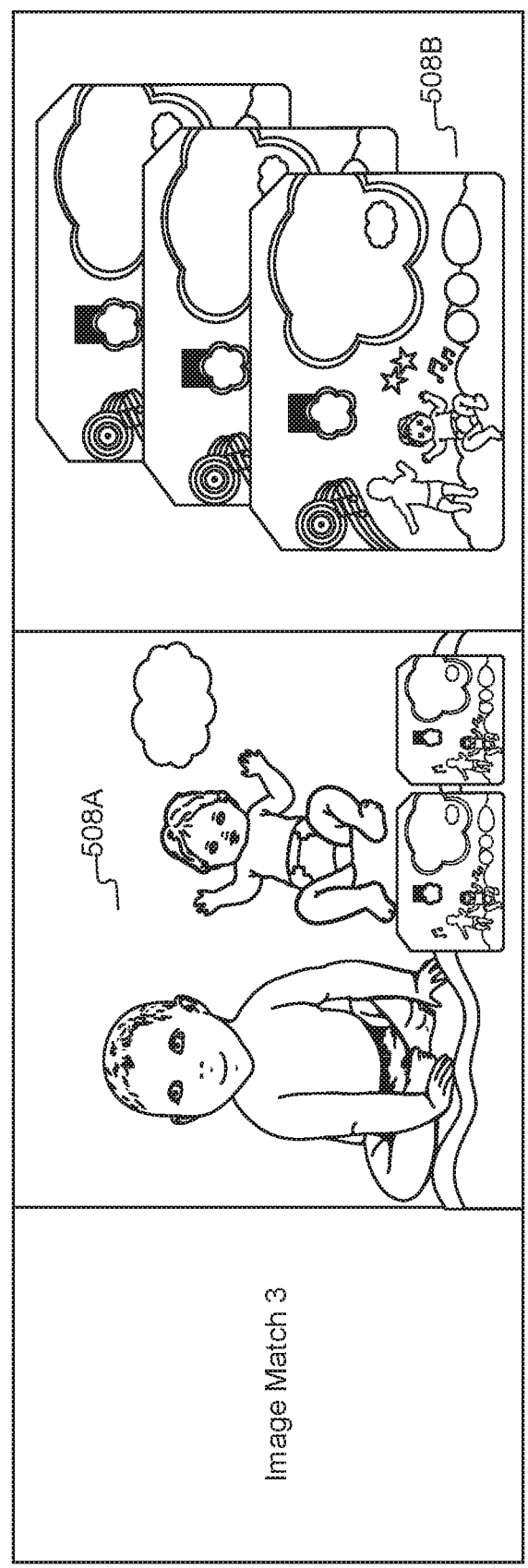

FIGS. 5A and 5B depicts examples of different images of products for reconciliation, consistent with the disclosed embodiments. As depicted in FIG. 5A, server 306 may analyze image 502A and image 502B and determine that image 502A is of lower quality than image 502B due to its warped aspect ratio, and thus server 306 may assign a higher data score to image 502B.

Images 504A/B-508A/B illustrate non-limiting examples of analyzing images based on image match. For example, server 306 may analyze image 504A and 504B and determine that image 504B is a better image match, and assigns a higher data score to image 504B. Image 504B may be a better image match since image 504B is a better representation of the actual product, unclutter by other items as is the case in image 504A. In another example, server 306 may analyze image 506A and 506B and determine that image 506B is a better match because it is more likely that products sold in bulk have lower unit price than a single product. In yet another example, server 306 may analyze image 508A and 508B and determine that image 508B is a better match because it presents the product in a manner that is less distracting to customers than image 508A.

In step 410, server 410 reconciles data.

In some embodiments, database reconciliation includes generating reconciled data for each of the attribute categories, the reconciled data being the attribute data in each of the attribute categories having the highest data score. For each attribute category and/or field, server 306 may rank the attribute data based on the associated data scores, and select for each attribute category and/or field, the attribute data having the highest data score. Thus, for the product in question, each category and/or field may now only have one attribute data, resolving issues of duplicate or conflicting attribute data for the same product from the different vendors. Moreover, since the reconciled data are attribute data having the highest data score, the reconciled data may have high likelihood of having the most complete and highest quality data than ones that are supplied from individual vendors. In some embodiments, the reconciled data may contain attribute data supplied by multiple vendors. For example, for a scarf, the system vendor may provide attribute data describing color and size but failed to provide attribute data describing the material of the scarf, while a brand vendor provides attribute data describing the material. Server 306 may generate reconciled data for the scarf including attribute data for color and size from the system vendor, and material from the brand vendor.

In step 412, server 306 stores the reconciled data in reconciled DB 308.

In some embodiments, database reconciliation includes storing in a database, the plurality of attribute categories each containing reconciled data corresponding to the product. The reconciled data obtained in step 410 may be stored in a database, such as reconciled DB 308.

In some embodiments, database reconciliation includes providing, from the database, the reconciled data for display on a display interface. Shoppers using user devices 310 may view products on displays such as SDP depicted in FIG. 1C. As previously discussed, SDP may be generated by system 100 using reconciled data retrieved from reconciled DB 308.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for database reconciliation, comprising:
receiving, from one or more sources, attribute data of a plurality of attribute data types representing aspects of a product, wherein each of the one or more sources has a source score, based on a source status for each of the one or more sources and a length of active time period of each of the one or more sources, and wherein the attribute data are associated with a corresponding source score;
generating a plurality of attribute categories based on the received attribute data types, each attribute category corresponding to one of the received attribute data types and containing all attribute data of the one of the received attribute data types;
training one or more machine learning models to process data to make predictions based on image characteristics;
determining data scores for each of the attribute data contained in each of the plurality of attribute categories, based on the source score and a product specification, the determining comprising:

analyzing each of at least one image, by the one or more trained machine learning models; and determining, by one of the one or more trained machine learning models, image match between the at least one image and a representation of a corresponding product in at least one image of the product;

assigning a data score based on the image match determined by the one of the one or more trained machine learning models;

generating reconciled data for each of the attribute categories, the reconciled data being the attribute data in each of the attribute categories having the highest data score and image match data score based on information in the product specification indicating higher quality data;

storing in a database, the plurality of attribute categories each containing reconciled data corresponding to the product;

providing, from the database and via a database-to-database network connection, the reconciled data for display on a display interface with interactive user interface elements, wherein the interactive user interface elements include at least a tab enabling switching between interfaces; and in response to a user interaction with the interactive user interface elements, transmitting a request to initiate a purchase to an external front end system.

2. The method of claim 1, wherein determining a data score for each of the at least one image comprises:

analyzing each of the at least one image, using the one or more trained machine learning models, for at least one of image size, image pixel, or resolution; and generating the data score for each image based on the analysis.

3. The method of claim 1, wherein:

the plurality of attribute data types include product names, the attribute data of the product names are character strings of names; and determining a data score for the character strings of names comprises determining source scores corresponding to the character strings of names.

4. The method of claim 1, wherein:

the plurality of attribute data types include one or more fields relating to product specifications, the attribute data of the one or more fields are character strings corresponding to the one or more fields; and determining a data score for the character strings corresponding to the one or more fields, comprises:

identifying the one or more fields associated with each of the one or more sources;

determining source scores corresponding to the character strings corresponding to the one or more fields; and generating the data score for character strings corresponding to each of the one or more fields based on the number of one or more fields associated with each of the one or more sources and the source scores.

5. The method of claim 4, wherein the one or more fields comprise at least one of size, color, model, production year, or serial number.

6. The method of claim 1, wherein the source status comprises one of a system retail status, brand vendor status, or third party status.

7. The method of claim 6, wherein a length of active time period of a source is determined based on the earliest registration time of the source.

8. The method of claim 7, wherein the system retail status has a source score higher than that of the brand vendor status, and the brand vendor status has a source score higher than that of a third party status; and wherein when two or more sources have the same source status, a source having a longer length of active time period has a higher source score than sources having a shorter length of active time period.

9. A system for database reconciliation, comprising:

at least one processor;

a memory comprising instructions, that when executed by the at least one processor, performs steps comprising:

receiving, from one or more sources, attribute data of a plurality of attribute data types representing aspects of a product, wherein each of the one or more sources has a source score, based on a source status for each of the one or more sources and a length of active time period of each of the one or more sources, and wherein the attribute data are associated with a corresponding source score;

generating a plurality of attribute categories based on the received attribute data types, each attribute category corresponding to one of the received attribute data types and containing all attribute data of the one of the received attribute data types;

training one or more machine learning models to process data to make predictions based on image characteristics;

determining data scores for each of the attribute data contained in each of the plurality of attribute categories, based on the source score and a product specification, the determining comprising:

analyzing each of at least one image, by the one or more trained machine learning models;

determining, by one of the one or more trained machine learning models, image match, between the at least one image and a representation of a corresponding product in at least one image of the product;

assigning a data score based on the image match determined by the one of the one or more trained machine learning models;

generating reconciled data for each of the attribute categories, the reconciled data being the attribute data in each of the attribute categories having the highest data score and image match data score based on information in the product specification indicating higher quality data;

storing in a database, the plurality of attribute categories each containing reconciled data corresponding to the product;

providing, from the database and via a database-to-database network connection, the reconciled data for display on a display interface with interactive user interface elements, wherein the interactive user interface elements include at least a tab enabling switching between interfaces; and in response to a user interaction with the interactive user interface elements, transmitting a request to initiate a purchase to an external front end system.

10. The system of claim 9, wherein determining a data score for each of the at least one image further comprises:

analyzing each of the at least one image, using the one or more trained machine learning models, for at least one of image size, image pixel, or resolution; and generating the data score for each image based on the analysis.

11. The system of claim 9, wherein the plurality of attribute data types include product names, the attribute data of the product names are character strings of names; and
- determining a data score for the character strings of names comprises: determining source scores corresponding to the character strings of names.

12. The system of claim 11, wherein:
- the plurality of attribute data types include one or more fields relating to product specifications, the attribute data of the one or more fields are character strings corresponding to the one or more fields; and
- determining a data score for the character strings corresponding to the one or more fields comprises:
 - identifying the number of one or more fields associated with each of the one or more sources;
 - determining source scores corresponding to the character strings corresponding to the one or more fields; and
 - generating the data score for character strings corresponding to each of the one or more fields based on the number of one or more fields associated with each of the one or more sources and the source scores.

13. The system of claim 12, wherein the one or more fields comprise at least one of size, color, model, production year, or serial number.

14. The system of claim 9, wherein the source status comprises one of a system retail status, brand vendor status, or third party status.

15. The system of claim 14, wherein a length of active time period of a source is determined based on the earliest registration time of the source.

16. The system of claim 15, wherein the system retail status has a source score higher than that of the brand vendor status, and the brand vendor status has a source score higher than that of a third party status; and
- wherein when two or more sources have the same source status, a source having a longer length of active time period has a higher source score than sources having a shorter length of active time period.

17. A method for generating text strings, comprising:
- receiving a request to reconcile entries relating to a product in a database;
- receiving attribute data of a plurality of attribute data types representing an aspect of the product from one or more sources, wherein each of the one or more sources has a source score, based on a source status for each of the one or more sources and a length of active time period of each of the one or more sources, and wherein the attribute data are associated with a corresponding source score;
- generating a plurality of attribute categories based on the received attribute data types, each attribute category corresponding to one of the received attribute data types and containing all attribute data of the one of the received attribute data types;
- training one or more machine learning models to process data to make predictions based on mage characteristics;
- determining data scores for each of the attribute data contained in each of the plurality of attribute categories, based on the source score and a product specification, the determining comprising:
 - analyzing each of at least one image, by the one or more trained machine learning models; and
 - determining, by wherein one of the one or more trained machine learning models, image match, between the at least one image and a representation of a corresponding product in at least one image of the product;
- assigning a data score based on the image match determined by the one of the one or more trained machine learning models;
- generating reconciled data for each of the attribute categories, the reconciled data being the attribute data in each of the attribute categories having the highest data score and image match data score based on information in the product specification indicating higher quality data;
- storing in the database, the plurality of attribute categories each containing reconciled data, corresponding to the product;
- providing to a display interface from the database and via a database-to-database network connection, the reconciled data for display with interactive user interface elements, wherein the interactive user interface elements include at least a tab enabling switching between interfaces; and
- in response to a user interaction with the interactive user interface elements, transmitting a request to initiate a purchase to an external front end system.

* * * * *

UNITED STATES PATENT AND TRADEMARK OFFICE
CERTIFICATE OF CORRECTION

| | | |
|---|---|---|
| PATENT NO. | : 11,775,565 B2 | Page 1 of 1 |
| APPLICATION NO. | : 17/070600 | |
| DATED | : October 3, 2023 | |
| INVENTOR(S) | : SungMin Park et al. | |

It is certified that error appears in the above-identified patent and that said Letters Patent is hereby corrected as shown below:

In the Claims

Claim 17, Column 22, Line 11, "on mage" should read as --on image--.

Signed and Sealed this
Twenty-eighth Day of November, 2023

*Katherine Kelly Vidal*

Katherine Kelly Vidal
*Director of the United States Patent and Trademark Office*